United States Patent [19]

Imura

[11] 4,368,967
[45] Jan. 18, 1983

[54] CAMERA DATA RECORDING DEVICE
[75] Inventor: Toshinori Imura, Sakai, Japan
[73] Assignee: Minolta Camera Kabushiki Kaisha, Osaka, Japan
[21] Appl. No.: 279,490
[22] Filed: Jul. 1, 1981
[30] Foreign Application Priority Data
  Jul. 1, 1980 [JP] Japan ................... 55-90442
[51] Int. Cl.³ .................. G03B 9/64; G03B 17/24
[52] U.S. Cl. .................. 354/106; 354/266
[58] Field of Search ............... 354/105, 106, 109, 238, 354/266, 267, 234

[56] References Cited
U.S. PATENT DOCUMENTS
3,889,281 6/1975 Taguchi et al. ................ 354/109
4,203,660 5/1980 Uchidoi et al. ................ 354/31

FOREIGN PATENT DOCUMENTS
50-25532 3/1975 Japan .
51-17017 2/1976 Japan .
53-9118 1/1978 Japan .

Primary Examiner—Michael J. Gellner
Attorney, Agent, or Firm—Wolder, Gross & Yavner

[57] ABSTRACT

A photographic data recording mechanism in a camera includes a data illumination lamp, a first timing circuit actuated in response to the camera shutter release member for energizing the lamp for a set time interval and a second timing circuit also actuated in response to the shutter release member for applying a control signal subsequent to the lamp energizing time interval to a control circuit of shutter releasing electromagnet to release the shutter. The second timing circuit is adjustable to vary the time of application of the control signal and in an alternative structure the lamp energizing circuit may be disabled and the control signal applied is immediate response to the actuation of the release member. A single electromagnet may function to sequentially release the leading or trailing shutter members or separate electromagnets may be employed.

15 Claims, 5 Drawing Figures

CAMERA DATA RECORDING DEVICE

BACKGROUND OF THE INVENTION

The present invention relates generally to improvements in camera and it relates particularly to an improved data recording device in a photographic camera.

Cameras heretofore available or proposed with a built-in data recording device may be classified into the following three types depending on the time when the data recording circuit operates.

(a) The data recording circuit which starts operating while the camera exposure control circuit is in operation.

(b) The data recording circuit which starts operating after the camera exposure control circuit has completed its operation.

(c) The data recording circuit which starts operating almost in synchronization with the commencement of the operation of the camera exposure control circuit.

With a camera of type (a), the data recording circuit is so arranged that it starts operating in response to the closure of the camera X contact. This arrangement may result in a high voltage being applied from an electronic flash to the data recording circuit, causing damage thereto. Additionally, when the electronic flash built into the camera body and the camera exposure control circuit operate on a common power supply, an overlap occurs between the time when the electronic flash unit is charged for subsequent firing after a flash in response to the closure of the X contact and the time when the data recording circuit operates. This overlap causes a power voltage variation, resulting in a malfunctioning of the data recording circuit.

With a camera of type (b), a power switch for the data recording circuit is maintained in its ON position when the camera shutter release button is depressed. As a result, releasing the shutter release button immediately after exposure may cause the power switch to be opened during the data recording period. Therefore, with this type of camera data recording system the desired data is not properly recorded under suitable exposure conditions.

A characteristic of the camera of type (c), is that the data recording circuit starts to operate immediately after the shutter release operation. However, there occurs an overlap between the operating times of the data recording circuit and the exposure control circuit. This results in a power voltage variation during the shutter exposure operation, causing the exposure control circuit to malfunction, whereby an exposure error occurs.

Specifically, the data recording circuits of the above type start operating simultaneously with, before or after the operation of the exposure control circuit in response to the shutter release operation, and completes its operation when the exposure circuit is in operation. The electrical loading by the data recording circuit of the power supply circuit is interrupted thereby causing the power voltage to over rebound, whereby the exposure control circuit is affected and fails to operate properly.

SUMMARY OF THE INVENTION

A principal object of the present invention is to provide an improved camera with a built-in data recording device.

Another object of the present invention is to provide a camera with a built-in data recording device, to which the application of a high voltage even in flash photography, is obviated.

A further object of the present invention is to provide a camera with a built-in data recording device in which data is always recorded on the film with the proper exposure.

Yet another object of the present invention is to provide a camera with a built-in data recording device which is of the type which is actuated in relation to the shutter release operation and in which the exposure control circuit is capable of uniformly proper operation without any influence of a power voltage variation caused by the operation of the data recording circuit.

In a camera according to the present invention, a data recording mechanism includes a lamp and a lamp energizing network which are energized for a predetermined interval upon actuation of the shutter release member, and the shutter release network is energized only after the termination of the data recording operation.

DETAILED DESCRIPTION OF THE PREFERRED EMBODIMENTS

Figure 1:
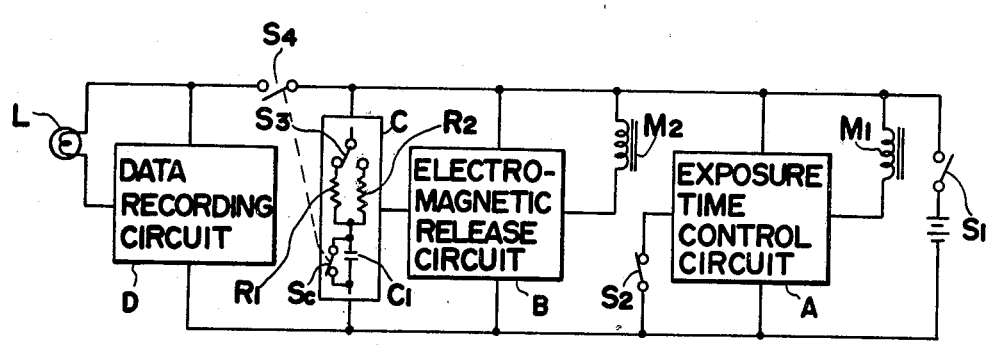
FIG. 1 is a circuit diagram of an embodiment of the present invention.
Figure 2:
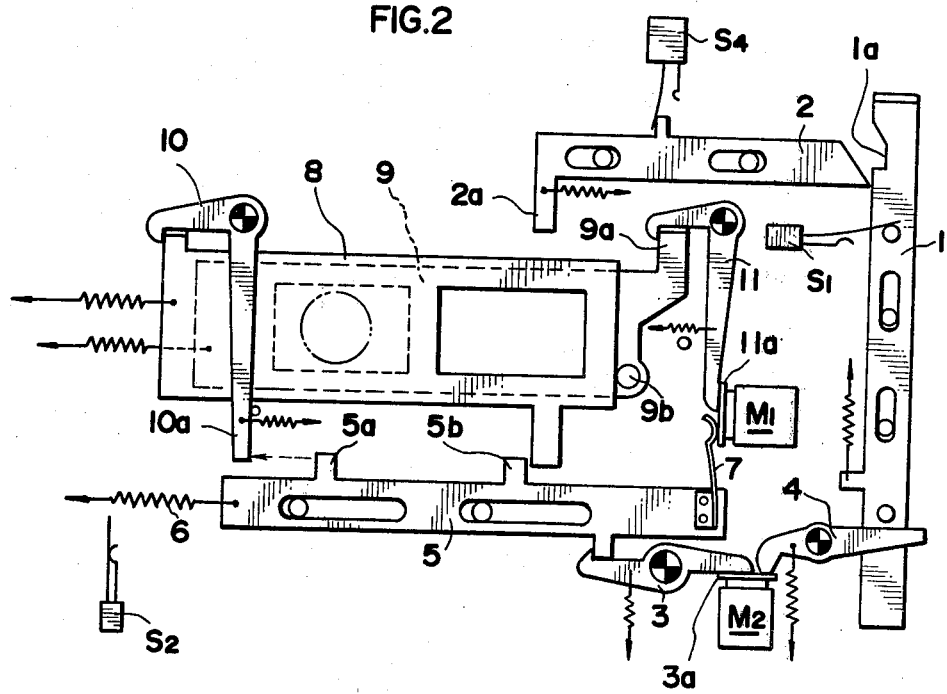
FIG. 2 is a schematic diagram of the principal part of a camera including the circuitry of FIG. 1.

Referring now to the drawings, particularly FIGS. 1 and 2 which illustrate an embodiment of the present invention, the improved mechanism includes a power switch S1, an exposure control electromagnet M1 and a shutter release electromagnet M2. An exposure time control circuit A which may be of known construction is arranged to start counting the exposure time when a trigger switch S2 is opened almost in synchronization with the traveling start of a leading shutter member and to generate a signal for de-energizing electromagnet M1 after a predetermined lapse of time commensurate with the object brightness. An electromagnetic release circuit B for controlling electromagnet M2 is energized when power switch S1 is closed and is de-energized by a signal from a delay circuit C. Delay circuit C includes a capacitor C1, and a first resistor R1 and a second resistor R2 which are arranged to be alternatively connected to capacitor C1 by means of a changeover switch S3 which is manually operable outside the camera. First resistor R1 in relation to capacitor C1 is given a resistance value allowing a sufficient delay to correspond to the time required for data recording from the actuation of a count switch Sc shunting capacitor C1. Second resistor R2 is of a resistance value allowing a delay time for a self-time, e.g., about a 10-second delay. A data recording circuit D is arranged to energize data recording lamp L when a data start switch S4 is closed in response to the shutter release operation and to turn off lamp L after a predetermined lapse of time controlled in accordance with the sensitivity of the employed film. It should be noted that count switch Sc is interconnected to the data start switch S4 so that both switches operate in the opposite order, that is, when one is closed, the other is opened.

As seen in FIG. 2, there is provided a shutter release lever 1 which is manually depressible from the outside of the camera and closes power switch S1 during its depression. A notch 1a is formed near the top end of shutter release lever 1. When shutter release lever 1 closes power switch S1 and a pressure lever 4 is rotated clockwise to be disengaged from stop lever 3, lock lever 2 biased to abut upon shutter release lever 1 slides into engagement with notch 1a so that shutter release lever 1 is blocked from upwardly returning. Data start switch S4 is located proximate lock lever 2 and is closed when lock lever 2 is shifted into engagement with notch 1a. Shutter release electromagnet M2 is located proximate the bottom end of shutter release lever 1, and an armature 3a integrally formed on stop lever 3 and biased counterclockwise or upwardly, confronts the attracting surface of electromagnet M2. Pressure lever 4 is biased to press armature 3a against electromagnet M2 and is retracted by shutter release lever 1 to separate from armature 3a after shutter release lever 1 has closed power switch S1. An actuating member 5 is laterally movably supported and is biased the leftward direction by a spring 6 and is provided with a shutter release projection 5a and shutter charge projection 5b integrally formed thereon. In addition, a pressure leaf spring 7 is attached to the tail end of actuating member 5 in order to press an armature 11a of a trailing shutter member lock lever (to be described later) against electromagnet M1. Trigger switch S2, which is normally closed, is disposed to position the movable contact thereof in the end of the trailing path of actuating member 5. A leading shutter member 8 and a trailing shutter member 9 are biased to travel in the leftward direction from the in charged positions shown in FIG. 2. A leading shutter member lock lever 10 releasably locks leading shutter member 8 in its charged position shown in FIG. 2, and one end 10a thereof is disposed within the traveling path of shutter release projection 5a. A trailing shutter member lock lever 11 releasably locks trailing shutter member 9 in its charged position. An armature 11a engagable with exposure control electromagnet M1 is integrally formed on one end of lock lever 11, and is arranged to lock trailing shutter member 9 in its charged position as long as armature 11a is attracted to electromagnet M1.

Considering the operation of the arrangement described above, when the camera shutter release button is depressed, shutter release lever 1 moves downwardly in response thereto, and closes power switch S1 during the downward shift of lever 1, whereby electromagnets M1 and M2 are energized. When the shutter release button is further depressed, pressure lever 4 is retracted and separated from armature 3a and then lock lever 2 slides into engagement with notch 1a formed in shutter release lever 1 so that it is prevented from returning upwards, thus maintaining power switch S1 thereafter closed. When shifted to its shutter release lever locking position, lock lever 2 actuates or closes data start switch S4 so that count switch Sc is opened in response thereto and the count of a delay time is started through circuit C. At the same time, lamp L is energized lighting up to start data recording. A charging current flows into capacitor C1 of delay circuit C in response to the changeover of switch S4 since count switch Sc is opened, and delay circuit C generates a signal for de-energizing electromagnet M2 after a predetermined lapse of time controlled by the time constants of first resistor R1 and capacitor C1. The duration from the opening of count switch Sc to the generation of a signal from delay circuit C, that is, the delay time, is set longer than the duration of the data lamp lighting, whereby shutter release electromagnet M2 is de-energized upon completion of data recording. That is, as explained earlier, data recording circuit D controls data illumination lamp L which has energized and lit in response to the shutter release operation so that data on the film plane is exposed for a predetermined time interval depending on the film sensitivity input to the circuit. Thereafter, lamp L is de-energized and extinguished, and data recording is complete. The completion of the data recording is followed by a signal generated by delay circuit C1, thereby actuating electromagnetic release circuit B so as to cut off the energizing current to electromagnet M2, which is, in turn, de-energized.

When electromagnet M2 is de-energized, stop lever 3 shown in FIG. 2 rotates counterclockwise to release actuating member 5 from its stopped retracted condition. As a result, actuating member 5 is advanced leftwards under the influence of spring 6, and strikes and advances tail end 10a of leading shutter member lock lever 10 with release projection 5a at the early part of its advance, whereby to release leading shutter member 8 from its cocked condition (for the start of exposure). Furthermore, the advance of actuating member 5 releases trailing shutter member lock lever 11 from its depressed condition by pressure spring 7. At this time, however, trailing shutter member lock lever 11 is not rotated simultaneously with the start of the actuating member travel because lock lever 11 remains attracted to electromagnet M1 which has been energized since power switch S1 was closed. When actuating member 5 opens trigger switch S2 almost in synchronization with the start of the leading shutter member advance, exposure control circuit A begins its light measurement in the known manner and cuts off the current to electromagnet M1 after a predetermined lapse of time commensurate with the object brightness, whereby electromagnet M1 is de-energized. With electromagnet M1 de-energized, trailing shutter member lock lever 11 is released from its retracted condition to rotate clockwise, thereby releasing trailing shutter member 9 from its charged or cocked position shown in FIG. 2 (for the shutter closure). During the advance of trailing shutter member 9 for the shutter closure, locked end 9a thereof engages projection 2a of lock lever 2 to travel together therewith. Therefore, lock lever 2 is retracted from notch 1a of shutter release lever 1, and returns to the unlocked position shown in FIG. 2, whereby data start switch S4 is turned off and opened, and shutter release lever 1 returns to its upper position shown in FIG. 2 to open power switch S1. As referred to hereinabove, all operations in relation to the shutter release operation are complete.

Next, the shutter is charged when actuating member 5 is shifted to the right against the action of spring 6 through the operation of a film wind-up mechanism (not shown). That is, when actuating member 5 is shifted to the right, shutter charging projection 5b thereof pushes leading shutter member 8 towards its charged position, thereby pushing trailing shutter member 9 in the same direction by means of pin 9b provided thereon. When returned to its initial position shown in FIG. 2, actuating member 5 is releasably locked in its retracted position by stop lever 3. At the same time, leading shutter member 8 is releasably locked in its cocked position by leading shutter member lock lever 10 and trailing shutter member 9 is releasably locked in its cocked position by trailing shutter member lock lever 11 after their rotation under the action of pressure spring 7 to the positions where they are pressed against the electromagnet. FIG. 2 shows the above condition upon completion of the shutter charging operation.

It should be noted that the shutter may be released for self-timer photography by externally operating changeover switch S3 to connect second resistor R2, instead of first resistor R1, to capacitor C1. In this case, lock lever 2 locks shutter release lever 1 to a position where power switch S1 is closed, thus requiring no shutter release button to be continuously depressed. In addition, film exposure is started as described above when shutter release electromagnet M2 is de-energized after a predetermined lapse of time, e.g., 10-second delay, determined by the time constants of second resistor R2 and capacitor C1. It should be understood that lock lever 2 operates as explained above, causing data start switch S4 to be closed for data recording. In this case, however, a delay time by the self-timer is set sufficiently longer than the delay time by first resistor R1 and capacitor C1, thereby preventing the shutter from being released for exposure during the data recording interval.

Figure 3:
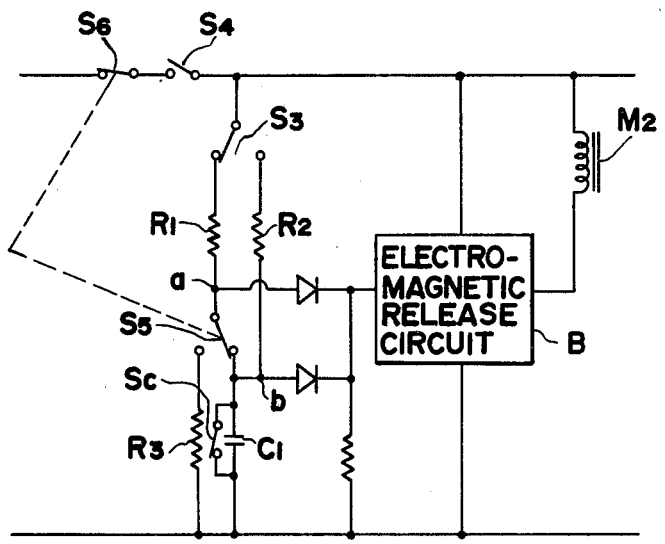
FIG. 3 is a circuit diagram partially illustrating a modification of FIG. 1.

Shown in FIG. 3 is a modification of the circuit of FIG. 1. The first embodiment functions to record the photographic data at all times, whereas in the present embodiment, the data recording circuit is selectively rendered in operative at the will of a photographer.

The same reference numerals are used for corresponding components in both embodiments and a further description thereof is omitted. Capacitor C1 and third resistor R3 disposed in parallel are alternatively connected in series with first resistor R1 through a changeover switch S5. Additionally, a data selection switch S6 is connected in series with data recording start switch S4. Switches S5 and S6 are ganged and are manually operable externally of the camera. Specifically, changeover switch S5 is arranged to transfer to the terminal on the capacitor side when selection switch S6 is closed, and to transfer to the terminal of the third resistor when switch S6 is opened by the external operation. Moreover, the circuit is so constructed that electromagnet release circuit B shown in FIG. 3 receives a voltage from the junction point a between first resistor R1 and third resistor R3 or capacitor C1 and a voltage from the junction point b between second resistor R2 and capacitor C1. For data recording, the arrangement last described performs ordinary and self-timer photography in exactly the same manner as in the first embodiment under the conditions shown in FIG. 3.

When data recording is not to be performed, selection switch S6 is externally manually opened, whereby selection switch S5 closes on the terminal of third resistor R3. When selection switch S6 is opened, no current flows into the data recording circuit, whereby the data lamp is not energized and does not light up even when the shutter is released. Therefore, no data is recorded. On the other hand, changeover switch S5 closing on the resistor side causes electromagnetic release circuit B to receive a voltage divided by first resistor R1 and third resistor R3 under ordinary photographic conditions. However, the resistance value of third resistor R3 is set to a value whose level causes a voltage at point a to invert electromagnetic release circuit B, which is actuated without delay to de-energize electromagnet M2 is synchronization with the shutter release operation. That is, the shutter is immediately actuated in response to the depression of the shutter releasing button. Furthermore, changeover switch S3 is actuated for self-time photography to connect second resistor R2 and capacitor C1 to electromagnetic shutter release circuit B, whereby the operation thereof is performed in the same manner as in the first embodiment, except that data is not recorded.

Figure 4:
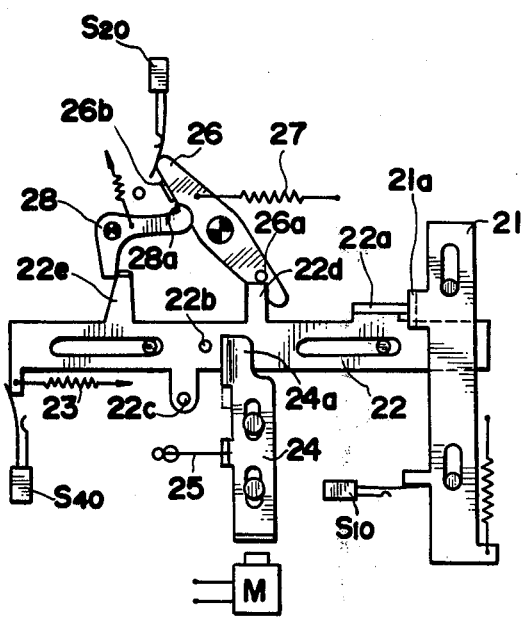
FIG. 4 is a schematic diagram of the principal part of a camera according to another embodiment of the present invention.
Figure 5:
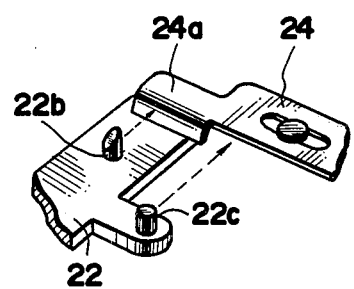
FIG. 5 is a perspective view of an enlarged part of FIG. 4.

FIGS. 4 and 5 show still another embodiment of the present invention, wherein only one electromagnet is required for both electromagnetic release and exposure control, resulting in the omission of one electromagnet as compared to the previous embodiments requiring two electromagnets, one for the elecromagnetic release and the other for exposure control, respectively.

With reference to FIG. 4, a shutter release button (not shown) is depressed, thereby causing a shutter release lever 21 to move downwards to close a power switch S10 and to retract bent piece 21a integrally formed on a shutter release lever 21 from the path of projection 22a formed on a shutter control member 22. Shutter control member 22 is urged under the influence of a spring 23 towards the right and closes data recording start switch S40 at the initial phase of its movement.

Shutter control member 22 is provided with a first control pin 22b and an arresting end 24a of a stop member 24, is transversely slidably supported relative to the path of pin 22b, whereby shutter control member 22 is stopped by stop member 24 after it has slightly moved.

The data recording circuit is actuated when data start switch S40 is closed by shutter control member 22, whereby a data image is photographed on the film with proper exposure determined in accordance with the film sensitivity. Until the data recording operation is completed, however, a delay circuit actuated in response to the shutter release operation does not actuate the electromagnetic release circuit and exposure control circuit.

Furthermore, when electromagnet M is energized by a signal from a delay circuit upon completion of data recording, stop member 24 is drawn downward against the action of spring 25 to shift arresting end 24a from the traveling path of first control pin 22b to that of second control 22c. Consequently, shutter control member 22 travels further to the right to disengage arresting projection 22d formed on the upper edge thereof from pin 26a of shutter operating lever 26, which is then immediately rotated in the clockwise direction under the influence of a spring 27 to open the shutter (not shown) and also open a trigger switch S20 (for the start of exposure timing).

Shutter control member 22, which has shifted to open the shutter, is stopped again at a position where arresting projection 22d is disengaged from pin 26a during the movement of shutter control member 22 so as to advance second control pin 22c into engagement with arresting end 24a of stop member 24 located at the electromagnet attracted position. When the exposure time control circuit then generates a shutter closing signal after a predetermined lapse of time commensurate with the object brightness, with trigger switch S20 opened, eletromagnet M is de-energized to release stop member 24. Thus, stop member 24 is retracted upwards under the influence of a reset spring 25 to release second control pin 22c, whereby shutter control member 22 travels further to the right and shutter closing projection 22e formed on the top edge thereof strikes pin 26a to forcibly rotate shutter operating lever 26 counterclockwise, thereby causing the shutter to be closed (for the completion of exposure). It should be noted that shutter release lever 21 is maintained in its depressed position by bent piece 22a of shutter control member 22. However, when shutter control member 22 moves, as described above, for closing the shutter, release member 21 is disengaged from bent piece 22a and returns upward, whereby power switch S10 is opened.

With the above embodiment, the shutter is charged by operating a film advance member as is known in the prior art. This operation resets shutter control member 22 to the left against the action of spring 23. Since projection 22a and first control pin 22b are positioned on the right of bent piece 21a on shutter release lever 21 and arresting end 24a of stop member 24, respectively, upon completion of the shutter release operation, shutter control member 22 is prevented from moving leftwards. With the present embodiment, however, both bent piece 21a and arresting end 24a are made elastic and resiliently deformable in order to avoid the above action. As shown in FIG. 5, for example, arresting end 24a of stop member 24, being in part elastic and changeable in shape, is capable of preventing first control pin 22b from moving rightward, but, when pin 22b moves to the left beyond arresting end 24a, the arresting end 24a is pushed upwards by pin 22b, thereby allowing its return. On the other hand, it is necessary to retain shutter operating lever 26 at the closed position to maintain the shutter closed until control member 22 is reset to the shutter charging position. The present embodiment is provided with a holding lever 28 for this purpose. As illustrated in FIG. 4, holding lever 28 is provided with hook portion 28a which is capable of arresting bent portion 26b of shutter operating lever 26 and is arranged to set hook portion 28a in the travel path of bent portion 26b immediately after shutter operating member 26 starts rotating clockwise for opening the shutter. Therefore, under the condition of the shutter being released, shutter operating lever 26, which is forcibly rotated to return to its charged position by shutter closing projection 22e, is maintained at its charged position (a position slightly offset in the counterclockwise rotation from the position shown in FIG. 5) by holding lever 28, whereby the shutter is not opened even if shutter closing projection 22e leaves pin 26a when the shutter is charged. Furthermore, immediately before shutter control member 22 is reset to the shutter charged position, holding member 28 is rotated by the pressure of projection 22e. As, however, arresting projection 22d has already returned to the rotating path of pin 26a, shutter operating lever 26 is arrested at a position where it engages projection 22d after a slight clockwise rotation for subsequent photography (for the completion of shutter charging).

The structure of the present invention is designed to start the shutter at a predetermined lapse of time after the shutter release operation using a delay circuit provided thereon, whereby the working time of the exposure time control circuit never overlaps that of the data recording circuit, both circuits being energized by a common electric power source. In accordance with the present invention, therefore, an exposure control circuit is not affected by any power voltage variation caused by the completion of the data recording circuit, thereby guaranteeing the correct operation under a uniform and constant voltage at all times.

While there have been described and illustrated preferred embodiments of the present invention, it is apparent that numerous alterations, omissions and additions may be made without departing from the spirit thereof.

What is claimed is:

1. In a camera including a shutter movable between a releasably locked charged position and a discharged position through a shutter open exposure positive and a shutter release member, a data recording mechanism comprising:
    a data illumination lamp;
    a means responsive to the actuation of said shutter release member for energizing said lamp for a predetermined time interval; and
    means for releasing said shutter from its locked charged position following the termination of said lamp energizing predetermined time interval.

2. The data recording mechanism of claim 1 wherein said shutter releasing means includes an electromagnet for controlling the release of said shutter, a control circuit network for controlling the current to said electromagnet and shutter release timing means including a time delay network and responsive to the actuation of said shutter release member for applying to said control network subsequent to said lamp energizing time interval a predetermined control signal of a value to provide an output from said control network to said electromagnet to release said shutter.

3. The data recording mechanism of claim 2 wherein said shutter release timing means includes means for adjusting the time at which said predetermined control signal is applied to said control circuit network.

4. The data recording mechanism of claim 2 including means for disabling said lamp energizing means.

5. The data recording mechanism of claim 4 comprising means for selectively applying a shutter release signal to said control circuit network in response to the actuation of said release member and independent of said time delay network.

6. The data recording mechanism of claim 2 wherein said time delay network comprises an RC circuit.

7. A camera equipped with a data recording device, comprising:
    a data recording circuit;
    switch means for actuating said data recording circuit in response to a shutter release operation;
    means for alternatively generating first and second output signals, said first output signal being generated after the lapse of first time period from said shutter release operation which is at least as long as that required for the completion of the operation of said data recording circuit and said second output signal being generated after the lapse of second time period which is longer than said first time period and sufficiently long to be used as delay time for a self timer;
    exposure initiating means which is actuated in response to one of said output signals;
    an exposure control circuit for determining an exposure time; and
    actuating means for actuating said exposure control circuit in response to the actuation of said exposure initiating means.

8. A camera as set forth in claim 7, wherein said exposure initiating means includes a manually advancable shutter release member which is biased to return to a retracted position and wherein said signal output means includes a time delay circuit having a trigger switch actuated in response to the advance of said shutter release member to initiate the counting of a delay time.

9. A camera as set forth in claim 8 further comprising a power source switch connected to said data recording circuit and closed in the advanced position of said shutter release member and a lock member movable from a release position to a lock position for releasably maintaining said shutter release member in its advanced position.

10. A camera as set forth in claim 8, further comprising a shutter mechanism for effecting an exposure, and wherein said exposure initiating means includes an electromagnet having first and second conditions, a shutter control mechanism for interlocking said shutter mechanism with said electromagnet, said shutter control mechanism maintaining said shutter mechanism in its cocked condition when said electromagnet is in said first condition but effecting the opening of said shutter mechanism when said electromagnet is in said second condition, and an electromagnetic release circuit for controlling the condition of said electromagnet, said electromagnetic release circuit transferring said electromagnet from said first to said second condition in response to said output signal from said signal generating means.

11. A camera as set forth in claim 9, wherein said switch means for actuating said data recording circuit includes a normally open switch connected between said data recording circuit and a power source, said normally open switch being closed in response to the movement of said lock member from its release to its lock position.

12. A camera as set forth in claim 11, wherein said signal generating means comprises a time delay circuit including parallel connected first and second resistors of different resistance values, a capacitor connected in series with said resistors, and a manually operable switch for alternatively connecting one of said resistors into said time delay circuit, and wherein said trigger switch is connected in parallel with said capacitor and is opened in response to the closure of said normally open switch.

13. A camera as set forth in claim 12, wherein said signal generating means further includes a third resistor and a change-over switch for alternatively connecting smaller one of said first and second resistors to said capacitor and said third resistor, said smaller one of said first and second resistors and said third resistor generating at their junction a third output signal immediately after said shutter release operation.

14. A camera as set forth in claim 13 further comprising a normally closed switch connected between said data recording switch and a power source, said normally closed switch being interlocked with said change-over switch so that said normally closed switch is opened when said change-over switch is transferred to connect said smaller one of first and second resistors with said third resistor.

15. A camera equipped with a data recording device, comprising:
a data recording circuit;
switch means for actuating said data recording circuit in response to a shutter release operation;
means for generating an output signal after the lapse of a predetermined time from said shutter release operation, the time being at least as long as the time of operation of said data recording circuit;
exposure initiating means actuated in response to said output signal;
exposure control circuit for determining an exposure time; and
actuating means for actuating said exposure control circuit in response to the actuation of said exposure initiating means.

* * * * *